June 1, 1943.   M. LIWSCHITZ   2,320,875
MOTOR STARTING CONTROL
Filed Aug. 22, 1941    2 Sheets-Sheet 1

WITNESSES:
Wm. B. Sellers
Thos. C. Groome

INVENTOR
Michael Liwschitz.
BY
Paul E. Friedemann
ATTORNEY

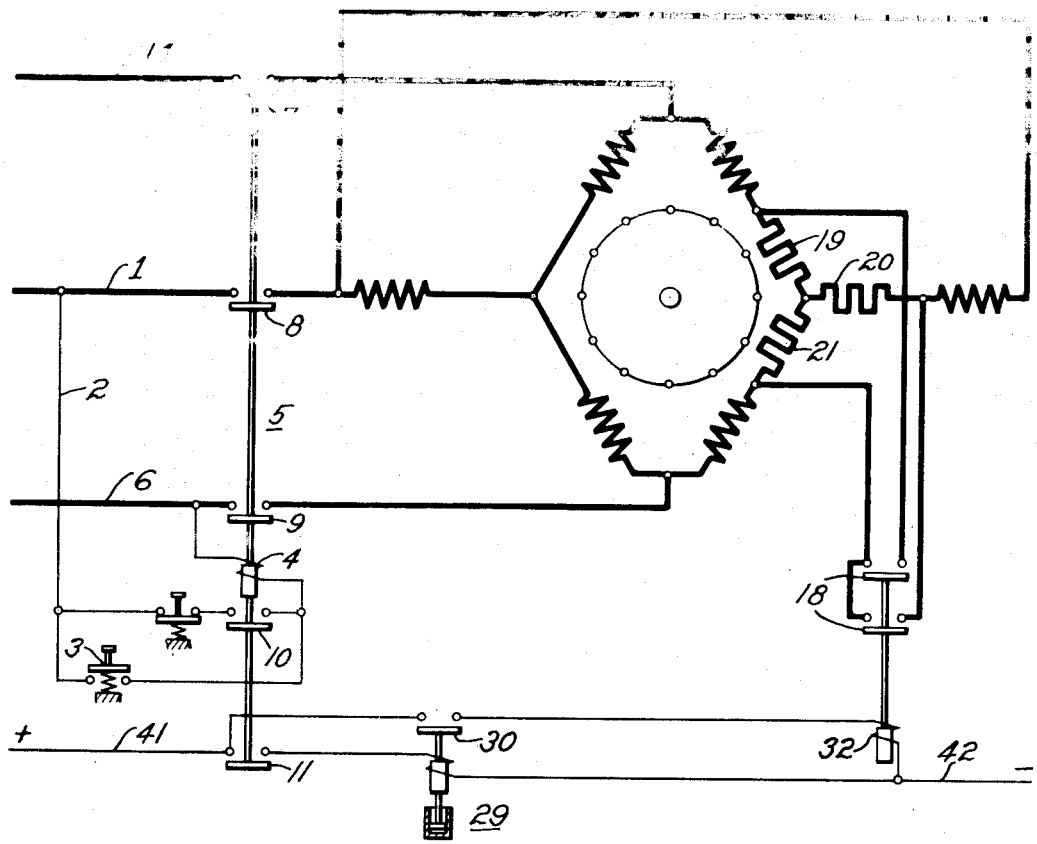

Patented June 1, 1943

2,320,875

UNITED STATES PATENT OFFICE 2,320,875

MOTOR STARTING CONTROL

Michael Liwschitz, Wilkinsburg, Pa., assignor to Westinghouse Electric & Manufacturing Company, East Pittsburgh, Pa., a corporation of Pennsylvania Application August 22, 1941, Serial No. 407,942

5 Claims. (Cl. 172—289)

My invention relates to starting control systems for motors and more particularly to starting control systems for alternating current motors, particularly synchronous motors and synchronous induction motors and induction motors.

With motors of the type mentioned considerable load current surges are produced on the supply line when such motors are connected directly to the line. To avoid such surges, which may cause damage to the motor, the load connected to it or to other electrical apparatus connected to line, auto-transformers and other means are often used to provide for low voltage starting. Means have also been proposed by the prior art for first connecting half of a dual circuit primary winding of a motor to the line and then connecting both halves to the line.

One of the objects of my invention is to improve the starting characteristics of motors without the use of auto-transformers, resistors, or other means outside of the motor.

Another object of my invention is to use only one group of dual windings, of a motor having two or more groups of dual windings, connected in a special arrangement during starting and then change the special circuit arrangement to a normal operating arrangement and use all the groups of the dual windings.

The objects herein recited are merely illustrative of many other objects of my invention, which many other objects will, no doubt, become more apparent from a study of the following specification when considered in conjunction with the accompanying drawings in which:

Fig. 3 is a diagrammatic showing of certain features of my invention as applied to an alternating current motor.

Figure 1:
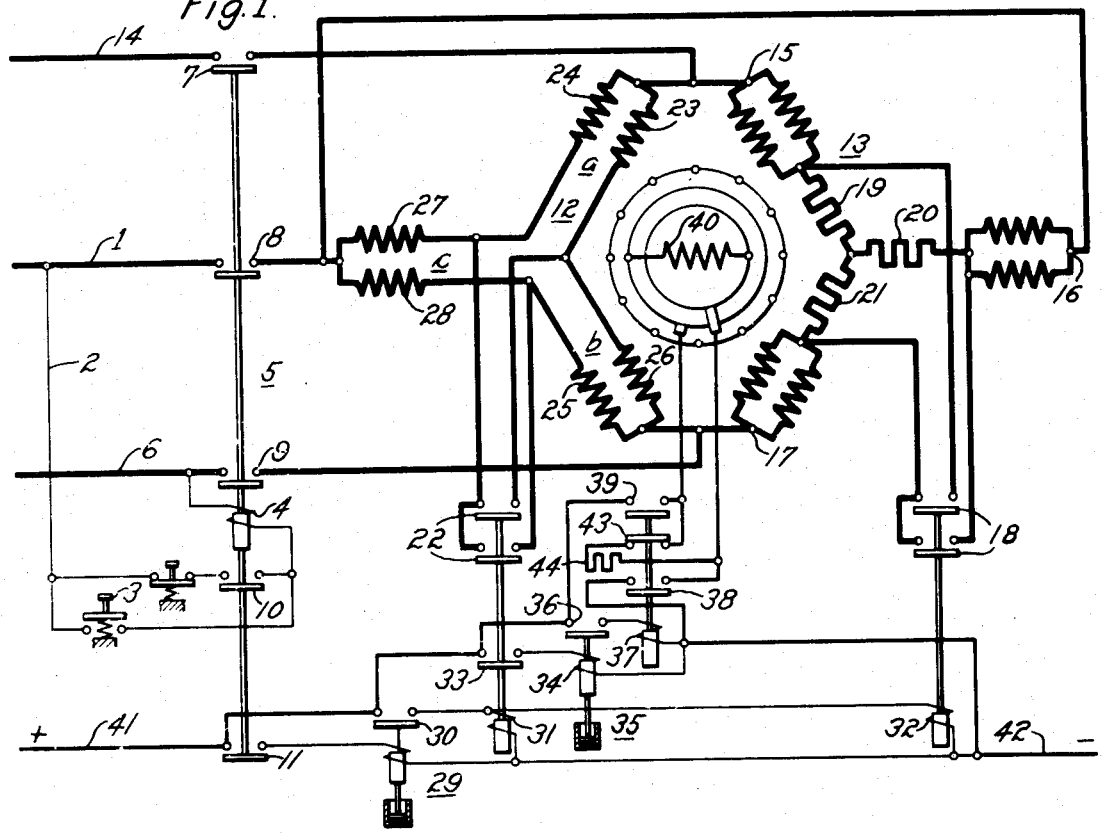
Figure 1 is a diagrammatic showing of my invention as applied to a synchronous motor.

In this description and the drawing accompanying it I disclose the combination of two proposals to improve the part winding starting of synchronous motors or induction motors with squirrel-cage rotors.

In the known part winding starting method each phase of the primary winding is divided into two or more parallel parts and only a part of each phase is used while starting. This changes the interlinkage of the windings comparatively with the full winding starting and reduces the starting torque and the starting current. If, for example, the primary winding is divided into two groups and only one group is used for the starting, at a given coil pitch, the starting current will be 57%, and the starting torque 49% of the values which the machine would have at full winding starting.

With my starting scheme a considerable still further improvement in starting performance can be obtained. This further improvement in starting performance I obtain by, first, subdividing each phase of the primary winding in still more parts, and second, by counter-connecting of parts belonging while running to a certain phase with parts belonging to the other two phases. The three phases are connected in delta while starting and in Y, or star, while running.

Figure 2:
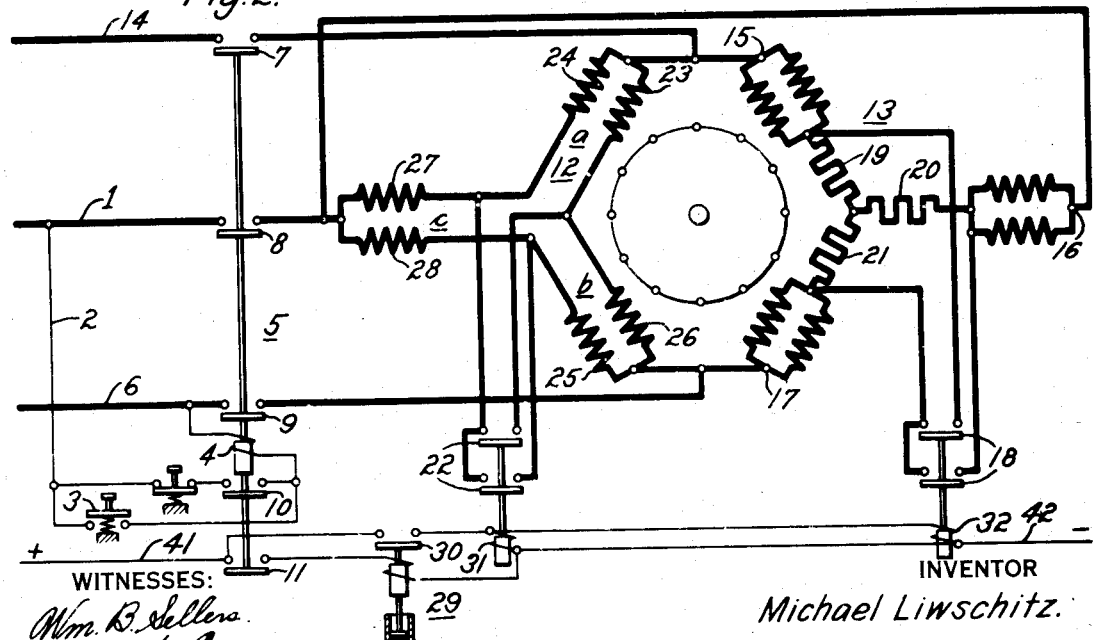
Fig. 2 is a diagrammatic showing of my invention as applied to an induction motor.

In the examples I show in Figures 1 and 2, I divide each phase in four instead of two parts. Each phase may, of course, contain even more parts, but for the sake of clarity I confine my discussion given hereinafter to a division of each phase into four parts. Both Figs. 1 and 2, respectively, explain the idea for two machines with four parallels in each.

During starting the procedure and circuit arrangements are as follows: The push button switch 3, referring to Fig. 1, is first operated to closed position. This operation establishes the following circuit from bus 1 through conductor 2, switch 3, actuating coil 4 of line contactor 5 to bus 6. Operation of line contactor 5 causes the closure of contact members 7, 8, 9 10, and 11.

Closure of contact members 7, 8, and 9 connects the primary windings 12 and 13 to buses 1, 6 and 14. The primary winding 12 is the one I wish to use during starting making the primary winding 13 the idle winding for the time being.

The primary winding 13 could, of course, be left idle by interposing a three-pole switch in open condition, between junctions 15, 16, and 17 and the primary winding 12. Such a switch is expensive, requires a higher rating than needed, and may be more difficult to add to the control. I prefer to use a smaller, cheaper, more efficient, and more reliable two-pole switch 18 in the neutral of the primary winding 13. A switch in the neutral, as I have shown, is to be preferred for the reasons already pointed out.

There is, however, one disadvantage attached to the use of such two-pole switch in the neutral. This takes place while switching on the primary windings 12 and 13, that is, during the closure of contact members 7, 8, and 9, a reflected voltage wave occurs at the neutral of the idle part which can break down the insulation between conductors, In order to avoid this disadvantage, I use three resistor sections 19, 20, and 21, connected in parallel to switch 18, in the neutral as shown. These resistors 19, 20, and 21 need to be designed for no more than about 5% to 8% of the normal current of the idle part, or winding 13, of the motor and need carry current for only a short time. It is thus apparent that the resistors 19, 20, and 21, connected as shown, and while switch 18 is open in effect, make primary winding 13 the idle winding.

For primary winding 12 the connection is unique, since switch 22 is open during starting. The two parts of phase a are 23 and 24. While starting they are counter-connected, respectively, to the parts 26 and 27 of phases b and c, respectively, namely to parts of two other phases and belong to two different phases. Winding parts 25 and 28 are connected as shown. Winding parts 23 and 26 form one leg of a delta connection, winding parts 25 and 28 another leg of a delta connection, and winding parts 24 and 27 form the third leg of a delta connection.

With my arrangement and the same machine as above discussed for the prior art arrangement, it can be shown mathematically that the starting current will now be only 42% and the starting torque only 37% of the values which the machine would have at starting with the full winding.

The starting cycle is automatically completed by the operations that follow the operation of the line contactor 5. The contactor holds itself in by the closure of contact members 10 and the closure of contact members 11 sets up an energizing circuit for the timing relay 29.

The time limit of relay 29 is adjustable and is so adjusted that this relay closes its contact members as soon as the synchronous motor has attained the full speed, for the load on the motor, that can be obtained with primary winding 12. When contact members 30 are closed, the actuating coils 31 and 32 for switches 22 and 18, respectively, are simultaneously energized and switches 18 and 22 are closed.

The closure of switch 18 shunts resistors 19, 20, and 21 and effectively connects the primary 13 in star connection to the buses 1, 6 and 14. The closure of switch 22 eliminates the delta connection and connects parts 23 and 24 in parallel, parts 25 and 26 in parallel, and parts 27 and 28 in parallel with the parallel groups forming, respectively, the phases a, b, and c of a Y, or star, connection. The two primary windings 12 and 13 are thus connected in parallel for full winding operation.

The energization of coil 31 also causes the closure of contact members 33. The closure of contact members causes energization of coil 34 of the time limit relay 35. The time constant of relay 35 is adjustable and is adjusted so that its contact members 36 are not closed before the motor has attained the proper speed for synchronization. At that speed contact members 36 close to energize coil 37 of the field contactor.

Operation of the field contactor causes the closing of contact members 38 and 39 to thus connect the field winding 40 to the direct current buses 41 and 42. Operation of the field contactor also causes the opening of contact members 43 to thus disconnect the field discharge resistor 44 from the field winding. The starting is thus completed since the motor has been synchronized.

My starting control is equally as useful with a squirrel-cage induction motor, or even a wound-rotor induction motor, as with a synchronous motor. I show this arrangement in Fig. 2 to avoid a repetition of a description of the starting sequence for an induction motor and I have given the same reference characters to all the parts having substantially the same function as corresponding parts in Fig. 1. All the description hereinbefore given in connection with Fig. 1, except the parts thereof appertaining to motor synchronization, may be read on Fig. 2.

In Fig. 3 I show the utility and coaction of a single switch in the neutral of one of a pair of windings for an alternating current motor. In this figure I have shown a different motor than is shown in either Fig. 1 or 2 but all other elements, insofar as needed with a control of a motor having but two parallel primary windings, are the same and thus are designated by the same reference characters. The theory of operation applicable to Fig. 3 will be apparent from the foregoing discussion of Figs. 1 and 2. No further discussion is thus necessary.

The description hereinbefore given and the embodiments shown in the figures are merely illustrative of my invention, and are not to be interpreted in a limiting sense. The only limitations to my invention are expressed in the claims hereto appended.

I claim as my invention:

1. A starting scheme for an alternating current motor having two three phase primary windings each arranged for normal Y connection and each leg of each of the two three-phase primary windings having two parallel sections, a three phase source of supply, one of the primary windings having the second section of the first leg connected in series with the first section of the second leg and the second section of the second leg connected in series with first section of the third leg and the second section of the third leg connected in series with the first section of the first leg, the other of the primary windings having the sections of each leg of the Y connection connected in parallel and each parallel connection connected in series to a common neutral junction through three resistors connected in Y connection, said resistors having resistance values such as to make said other primary windings substantially inactive during the initial stages of starting of the motor and at the same time prevent damage to the insulation of these primary windings, switching means for connecting both primary windings to said source of supply, second switching means, operable after the operation of the first named switching means, and including means for connecting the sections of each leg of the said one of said primary windings in parallel and to a common neutral junction and for connecting the parallelly connected sections of each leg of the said other of the primary windings directly to a common neutral junction by shunting said resistor sections.

2. A starting scheme for an alternating current synchronous motor having two three phase primary windings each arranged for normal Y connection and each leg of each of the two three-phase primary windings having two parallel sections, a three phase source of supply, one of the primary windings having the second section of the first leg connected in series with the first section of the second leg and the second section of the second leg connected in series with first section of the third leg and the second section of the third leg connected in series with the first section of the first leg, the other of the primary windings having the sections of each leg of the Y connection connected in parallel and each parallel connection connected in series connected to a common neutral junction through three resistor sections connected in Y connection, said resistor sections having such resistance values as to make said other primary windings substantially inactive during starting of the motor, switching means for connecting both primary windings to said source of supply, second switching means, operable after the operation of the first named switching means, including means for connecting the sections of each leg of the said one of said primary windings in parallel and to a common neutral junction and for connecting the parallelly connected sections of each leg of the said other of the primary windings directly to a common neutral junction by shunting said resistor sections, and means, operable after the operation of said second switching means, for synchronizing said synchronous motor.

3. A starting scheme for an alternating current synchronous motor having two three phase primary windings each arranged for normal Y connection and each leg of each of the two three-phase primary windings having two parallel sections, a three phase source of supply, one of the primary windings having the second section of the first leg connected in series with the first section of the second leg and the second section of the second leg connected in series with first section of the third leg and the second section of the third leg connected in series with the first section of the first leg, the other of the primary windings having the sections in each leg connected in parallel, resistor sections, respectively, connected in series with each pair of parallel connected sections, said resistors being connected to a common neutral junction and having a resistance value sufficient to make said other primary windings substantially idle during the initial stages of motor starting, switching means for connecting both primary windings to said source of supply, a second switching means, operable after the operation of the first named switching means, including means for connecting the sections of each phase of the said one of said primary windings in parallel and to a common neutral junction and for shunting said resistors sections and means, operable after the operation of said switching means, for synchronizing said synchronous motor.

4. A starting control scheme for an alternating current motor having two three phase primary windings each comprising, when connected in its normal star connection, two parallelly connected sections in each leg, a three-phase source of supply of alternating current, switching means for connecting both primary windings to the source of supply, a star connected resistor control means, operable during starting of the motor by the operation of said switching means, for making one of said two primary windings substantially inactive by connecting each leg thereof in series with one leg of the star connected resistor and for connecting the other primary winding so that the second section of the first leg is in series with the first section of the second leg and connected across one phase of the supply, and the second section of the second phase is in series with the first section of the third leg and connected across the second phase of the supply, and the second section of the third leg is in series with first section of the first leg and connected across the third phase of the supply and means for connecting both primary windings each in its normal star connection to the source of supply.

5. A starting control scheme for an alternating current synchronous motor having two three phase primary windings each comprising when connected in its normal star connection, two parallelly connected sections in each leg, a three phase source of supply of alternating current, switching means for connecting both primary windings to the source of supply, an impedance comprising three sections connected in star connection, control means, operable during starting of the motor by the operation of said switching means, for making one of said two primary windings substantially inactive by connecting each leg thereof in series with one section of the impedance and for connecting the other primary winding so that the second section of the first leg is in series with the first section of the second leg and connected across one phase of the supply, and the second section of the second leg is in series with the first section of the third leg and connected across the second phase of the supply, and the second section of the third leg is in series with first section of the first leg and connected across the third phase of the supply, switching means for connecting both the first primary windings in its normal star connection to the source of supply, switching means for shunting the three sections of the impedance to connect the second primary windings to the source of supply, and means operable after the operation of the last named means, for synchronizing said synchronous motor.

MICHAEL LIWSCHITZ.